US012675205B2

(12) United States Patent
Kaufman

(10) Patent No.: US 12,675,205 B2
(45) Date of Patent: Jul. 7, 2026

(54) SYSTEMS AND METHODS FOR INTERACTIVELY DISPLAYING USER IMAGES

(71) Applicant: Daniel Kaufman, New York, NY (US)

(72) Inventor: Daniel Kaufman, New York, NY (US)

( * ) Notice: Subject to any disclaimer, the term of this patent is extended or adjusted under 35 U.S.C. 154(b) by 0 days.

(21) Appl. No.: 15/149,614

(22) Filed: May 9, 2016

(65) Prior Publication Data

US 2017/0357385 A1 Dec. 14, 2017

Related U.S. Application Data

(63) Continuation of application No. 13/300,403, filed on Nov. 18, 2011, now Pat. No. 9,335,895, which is a continuation of application No. 13/015,050, filed on Jan. 27, 2011, now abandoned, which is a continuation of application No. 11/805,638, filed on May 24, 2007, now Pat. No. 7,890,874.

(60) Provisional application No. 60/903,176, filed on Feb. 23, 2007.

(51) Int. Cl.
| | |
|---|---|
| *G06F 3/0482* | (2013.01) |
| *G06F 3/0481* | (2022.01) |
| *G06F 3/0484* | (2022.01) |
| *G06F 16/58* | (2019.01) |
| *G06F 16/635* | (2019.01) |
| *G06F 16/638* | (2019.01) |
| *G06F 16/64* | (2019.01) |
| *G06Q 10/10* | (2023.01) |

(52) U.S. Cl.
CPC .......... *G06F 3/0482* (2013.01); *G06F 3/0481* (2013.01); *G06F 3/0484* (2013.01); *G06F 16/58* (2019.01); *G06F 16/637* (2019.01);

*G06F 16/639* (2019.01); *G06F 16/64* (2019.01); *G06Q 10/10* (2013.01)

(58) Field of Classification Search
CPC ............. G06F 3/0482; G06F 17/30775; G06F 17/30772; G06F 17/30265; G06F 17/30766; G06F 3/0484; G06F 3/0481
See application file for complete search history.

(56) References Cited

U.S. PATENT DOCUMENTS

| | | | |
|---|---|---|---|
| 6,081,830 | A | 6/2000 | Schindler |
| 6,230,207 | B1 | 5/2001 | Roberts et al. |
| 6,233,682 | B1 | 5/2001 | Fritsch |
| 6,248,946 | B1 | 6/2001 | Dwek |
| 6,880,132 | B2 | 4/2005 | Uemura |
| 7,349,663 | B1 | 3/2008 | Joseph |

(Continued)

OTHER PUBLICATIONS

MySpace, "MySpace Music," published Oct. 16, 2004, pp. 1a-e, 2, 3a-b, 4, available at: http://www.myspace.com/music.

(Continued)

*Primary Examiner* — William L Bashore
*Assistant Examiner* — Gregory A Distefano
(74) *Attorney, Agent, or Firm* — Byrne Poh LLP

(57) ABSTRACT

In accordance with the present invention, an interactive user display application is provided. The application displays and refreshes images that are intended to represent users or members of a social network or other web-based service. Using these images, the interactive user display application allows a user of the application to interact with other users or their profiles while viewing their images or while interacting with or consuming media.

20 Claims, 7 Drawing Sheets default

(56)         References Cited

U.S. PATENT DOCUMENTS

| | | | |
|---|---|---|---|
| 7,363,372 | B2 | 4/2008 | Potenzone et al. |
| 7,657,910 | B1 | 2/2010 | McAulay et al. |
| 7,707,246 | B1 | 4/2010 | Issa et al. |
| 8,301,692 | B1 * | 10/2012 | Hamaker ........... G06Q 30/0631 |
| | | | 705/26.7 |
| 9,660,971 | B1 * | 5/2017 | Latin-Stoermer ............................ |
| | | | G06Q 30/0206 |
| 2002/0112239 | A1 | 8/2002 | Goldman |
| 2002/0138641 | A1 | 9/2002 | Taylor et al. |
| 2003/0074421 | A1 | 4/2003 | Kusano et al. |
| 2003/0105718 | A1 | 6/2003 | Hurtado et al. |
| 2004/0019497 | A1 * | 1/2004 | Volk ................. G06F 17/30017 |
| | | | 705/1.1 |
| 2005/0174975 | A1 | 8/2005 | Mgrdechian et al. |
| 2005/0216300 | A1 | 9/2005 | Appelman et al. |
| 2006/0015923 | A1 * | 1/2006 | Chuah ................. H04N 21/235 |
| | | | 725/135 |
| 2006/0143236 | A1 | 6/2006 | Wu |
| 2007/0130580 | A1 | 6/2007 | Covell et al. |
| 2007/0169165 | A1 | 7/2007 | Crull et al. |
| 2007/0282987 | A1 * | 12/2007 | Fischer .................. G06Q 10/10 |
| | | | 709/223 |
| 2008/0126935 | A1 | 5/2008 | Blomgren |
| 2008/0222295 | A1 | 9/2008 | Robinson et al. |
| 2009/0063983 | A1 | 3/2009 | Amidon et al. |
| 2011/0276882 | A1 * | 11/2011 | Buehler ................. H04H 60/31 |
| | | | 715/727 |

OTHER PUBLICATIONS

Notice of Allowance dated Jan. 7, 2016 in U.S. Appl. No. 13/300,403.
Notice of Allowance dated Oct. 5, 2010 in U.S. Appl. No. 11/805,638.
Office Action dated Jan. 14, 2015 in U.S. Appl. No. 13/015,050.
Office Action dated Mar. 27, 2014 in U.S. Appl. No. 13/015,050.
Office Action dated Jun. 4, 2015 in U.S. Appl. No. 13/300,403.
Office Action dated Jun. 10, 2010 in U.S. Appl. No. 11/805,638.
Office Action dated Sep. 11, 2013 in U.S. Appl. No. 13/015,050.
Office Action dated Oct. 22, 2014 in U.S. Appl. No. 13/300,403.

* cited by examiner

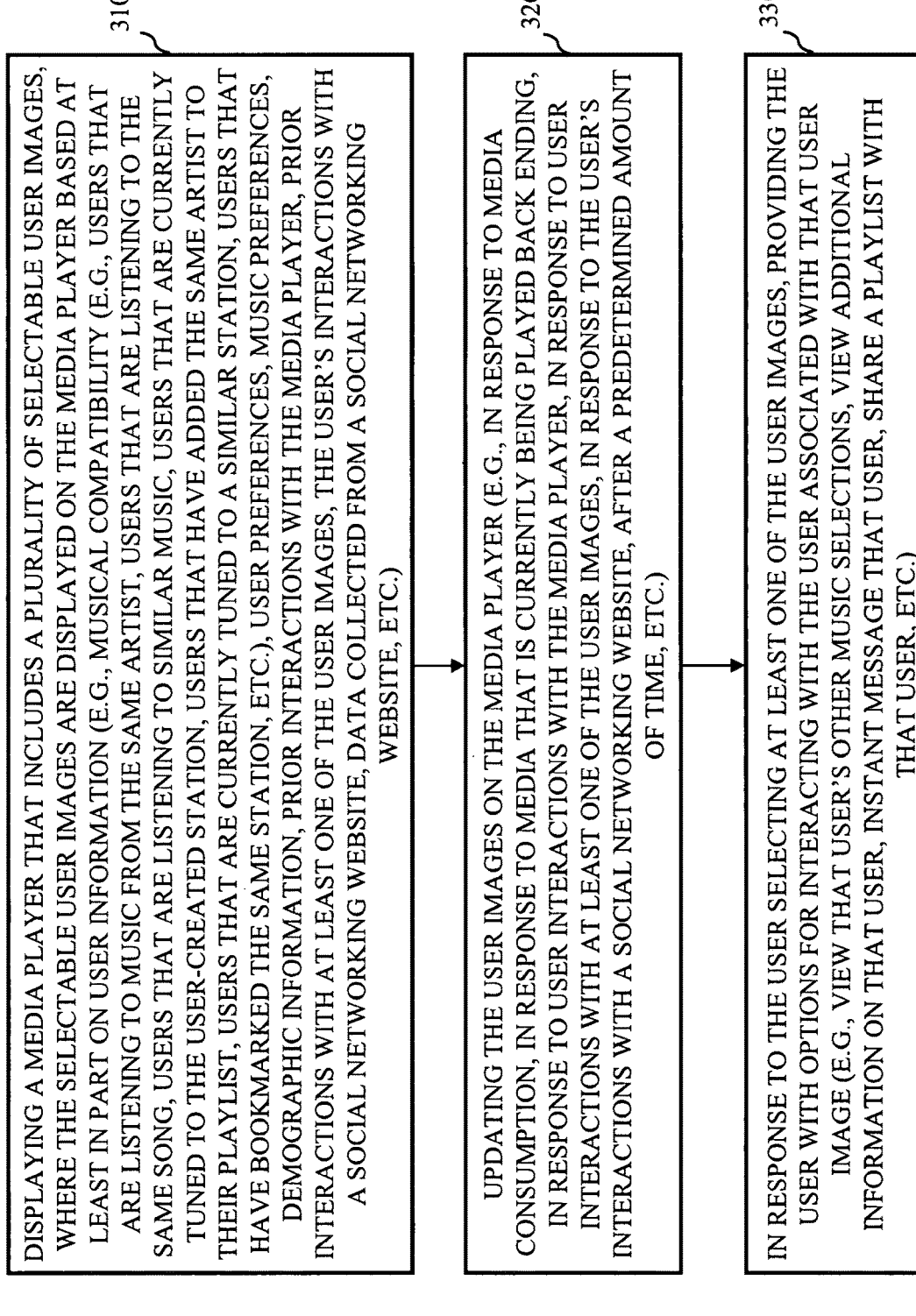

300

310
DISPLAYING A MEDIA PLAYER THAT INCLUDES A PLURALITY OF SELECTABLE USER IMAGES, WHERE THE SELECTABLE USER IMAGES ARE DISPLAYED ON THE MEDIA PLAYER BASED AT LEAST IN PART ON USER INFORMATION (E.G., MUSICAL COMPATIBILITY (E.G., USERS THAT ARE LISTENING TO MUSIC FROM THE SAME ARTIST, USERS THAT ARE LISTENING TO THE SAME SONG, USERS THAT ARE LISTENING TO SIMILAR MUSIC, USERS THAT ARE CURRENTLY TUNED TO THE USER-CREATED STATION, USERS THAT HAVE ADDED THE SAME ARTIST TO THEIR PLAYLIST, USERS THAT ARE CURRENTLY TUNED TO A SIMILAR STATION, USERS THAT HAVE BOOKMARKED THE SAME STATION, ETC.), USER PREFERENCES, MUSIC PREFERENCES, DEMOGRAPHIC INFORMATION, PRIOR INTERACTIONS WITH THE MEDIA PLAYER, PRIOR INTERACTIONS WITH AT LEAST ONE OF THE USER IMAGES, THE USER'S INTERACTIONS WITH A SOCIAL NETWORKING WEBSITE, DATA COLLECTED FROM A SOCIAL NETWORKING WEBSITE, ETC.)

320
UPDATING THE USER IMAGES ON THE MEDIA PLAYER (E.G., IN RESPONSE TO MEDIA CONSUMPTION, IN RESPONSE TO MEDIA THAT IS CURRENTLY BEING PLAYED BACK ENDING, IN RESPONSE TO USER INTERACTIONS WITH THE MEDIA PLAYER, IN RESPONSE TO USER INTERACTIONS WITH AT LEAST ONE OF THE USER IMAGES, IN RESPONSE TO THE USER'S INTERACTIONS WITH A SOCIAL NETWORKING WEBSITE, AFTER A PREDETERMINED AMOUNT OF TIME, ETC.)

330
IN RESPONSE TO THE USER SELECTING AT LEAST ONE OF THE USER IMAGES, PROVIDING THE USER WITH OPTIONS FOR INTERACTING WITH THE USER ASSOCIATED WITH THAT USER IMAGE (E.G., VIEW THAT USER'S OTHER MUSIC SELECTIONS, VIEW ADDITIONAL INFORMATION ON THAT USER, INSTANT MESSAGE THAT USER, SHARE A PLAYLIST WITH THAT USER, ETC.)

FIG. 3

SYSTEMS AND METHODS FOR INTERACTIVELY DISPLAYING USER IMAGES

CROSS-REFERENCE TO RELATED APPLICATION

This application is a continuation of U.S. patent application Ser. No. 13/300,403, filed on Nov. 18, 2011, which is a continuation of Ser. No. 13/015,050, filed on Jan. 27, 2011, which is a continuation of U.S. patent application Ser. No. 11/805,638, filed on May 24, 2007, now U.S. Pat. No. 7,890,874, which claims the benefit of U.S. Provisional Patent Application No. 60/903,176, filed on Feb. 23, 2007, each of which is hereby incorporated by reference herein in its entirety.

FIELD OF THE INVENTION

The present invention generally relates to systems and method for providing an interactive user display application. More particularly, the present invention relates to an interactive user display application that displays and refreshes selectable images of users of a social network or other web-based service. These images are presented to a viewer using the application based on interactions with or consumption of media.

BACKGROUND OF THE INVENTION

Social networking websites, such as MySpace, Friendster, and Facebook, have grown in popularity in the past few years. A user of a social networking website establishes an account and creates relationships with other accounts, thereby connecting the users in a network. While these websites have drawn together a large numbers of users, the introduction of media sharing features and matchmaking features on these sites that take advantage of their capabilities have been limited. In addition to social networking websites, users are using the Internet to consume media. For example, users are using Internet music services, such as iTunes, Rhapsody, Napster, MusicMatch, and Yahoo! LAUNCHcast, to consume music. In another example, users are using Internet video streaming services, such as YouTube and Google Video, to consume movies, television shows, personal productions, music videos, and other types of media. In yet another example, users are using Flickr or other online photo management and sharing services to share static images.

Thus, it would be desirable to provide an interactive user display application that displays and refreshes selectable images of users of a social network or other web-based service based on interactions with media or consumption of media.

It would also be desirable to allow users of the interactive user display application to communicate with other users through the selectable user images.

SUMMARY OF THE INVENTION

In accordance with the present invention, systems and methods for providing an interactive user display application are provided. In particular, systems and methods for displaying and refreshing selectable images of users of a social network or other web-based service based on interactions with media or consumption of media are provided.

In some embodiments, the interactive user display application receives music preferences from a user, where the music preferences include a preferred artist, a preferred genre of music, a preferred song, and/or a preferred music station. Based on the received music preferences, the application displays a media player that tunes to a user-created music station. The media player provides the user with an opportunity to tune to one of a plurality of user-created music stations. The application simultaneously displays a first set of selectable user images along with the media player. In response to the user interacting with the media player, the application updates the media player by displaying a second set of selectable user images. It should be noted that each user image of both the first set and the second set of selectable user images is selected for display based on the user interaction with the media player. It should also be noted that, in response to the user selecting one of the user images, user information associated with the selected user image is displayed and the user is provided with an opportunity to interact with that user associated with the selected user image.

In some embodiments, the application receives user information, such as demographic information, from the user.

In some embodiments, the application displays the second set of selectable user after a predetermined amount of time. In some embodiments, the application displays the second set of selectable user images in response to user interaction with the first set of selectable user images.

In some embodiments, in response to receiving a user selection of one of the user images from the first set, the application may retain that user image from the first set in the second set of selectable user images.

In some embodiments, the user images are selected for display from a plurality of user images based on at least one of: users that are currently tuned to the music station, users that are listening to the same song played by the music station, users that are listening to music from the same artist being played by the music station, users that are listening to a song from the same album being played by the music station, users that have added the song played by the music station to a playlist, user preferences, music preferences, demographic information, prior interactions with the media player, prior interactions with at least one of the displayed user images, user interactions with a social networking website, user interactions with a media application, and user interactions with a third-party website.

In some embodiments, the application may display options for interacting with the user associated with the selected user image. For example, in one embodiment, the application may display user information associated with the selected user image. In another embodiment, the application may display music selections associated with the selected user image that include at least one of: the music station currently tuned to, music stations most recently tuned to, music interests, and a playlist of songs. In yet another embodiment, the application may allow the user to transmit a message to the user associated with the selected user image.

In some embodiments, the application may allow the user to rate at least one of: the genre of music played by the music station, the song played by the music station, and the artist played by the music station.

In some embodiments, the application may transmit each user image or a plurality of user images to the media player.

In some embodiments, the media player may be displayed on a webpage or may be a standalone media player.

In some embodiments, the application may receive music preferences (e.g., a preferred artist, a preferred genre of music, a preferred song, and a preferred music station). The application may display a media player that tunes to a music station based on the received music preferences, wherein the media player provides a user with an opportunity to tune to one of a plurality of music stations. The application may receive a plurality of user images from an information source, where each of the plurality of user images corresponds to a member and has corresponding member information, and select a first set of user images from the plurality of received user images. The application may select the first set by comparing the music preferences and the member information corresponding to the plurality of received user images. After selecting the user images, the application displays the first set of selectable user images simultaneously with the displayed media player. In response to the user interacting with the media player or in response to a predetermined amount of time elapsing, the application updates the media player by selecting a second set of selectable user images from the plurality of received user images based at least in part on the user interactions with the media player and displaying the second set of selectable user images.

In response to the user selecting one of the user images, the application displays member information associated with the selected user image provides the user with an opportunity to interact with the member associated with the selected user image.

It should be noted that the information source may be, for example, a social networking website, an Internet dating website, an Internet music service, an Internet e-commerce service, an Internet portal, an Internet search engine, a music player, a media player, or a media management application.

In some embodiments, the application may allow the user to transmit a message to the member associated with the selected user image through the information source.

In some embodiments, the music preferences may be received from the user or an information source. In some embodiments, the user images and the corresponding member information may be received from an information source.

In some embodiments, the media player receives the music played over the music station from a broadcast source (e.g., an Internet media streaming service and an Internet radio station).

In some embodiments, the application may transmit a first query to the information source for members matching the music preferences. The application may receive the second set of selectable user images in response to transmitting a second query to the information source for other members matching the music preferences.

In some embodiments, the application may present the user with a publicly accessible website for playing media over the Internet, where the user is authorized to access features associated with the website upon inputting user information. In response to receiving user information from the user, the application plays media while simultaneously displaying a first set of selectable user images. The application replaces the first set of selectable user images with a second set of selectable user images.

It should be noted that the selectable user images are selected for display based on the received user information and the user images in the first set are different from the user images in the second set.

In some embodiments, the application may facilitate the interaction between a user of a media player and other users of the media player, where the media player monitors the user's interactions with the media player and the user's consumption of media using the media player. The application may provide a first set of selectable user images for display to the user. In response to the user's interactions with the media player, the user's consumption of media using the media player, and/or a predetermined time elapsing, the application provides a second set of selectable user images for display to the user. The first set of selectable user images is different from the second set of selectable user images. It should be noted that the first set and second set of selectable user images are provided based on at least one of: each user's interactions with the media player and each user's consumption of media using the media player.

Thus, there has been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and description matter in which there is illustrated preferred embodiments of the invention.

BRIEF DESCRIPTION OF THE DRAWINGS

Various objects, features, and advantages of the present invention can be more fully appreciated with reference to the following detailed description of the invention when considered in connection with the following drawings, in which like reference numerals identify like elements.

FIG. 3 is a flowchart illustrating the steps performed in providing an interactive user display application that displays selectable user images in accordance with some embodiments of the present invention.

DETAILED DESCRIPTION OF THE INVENTION

Figure 1:
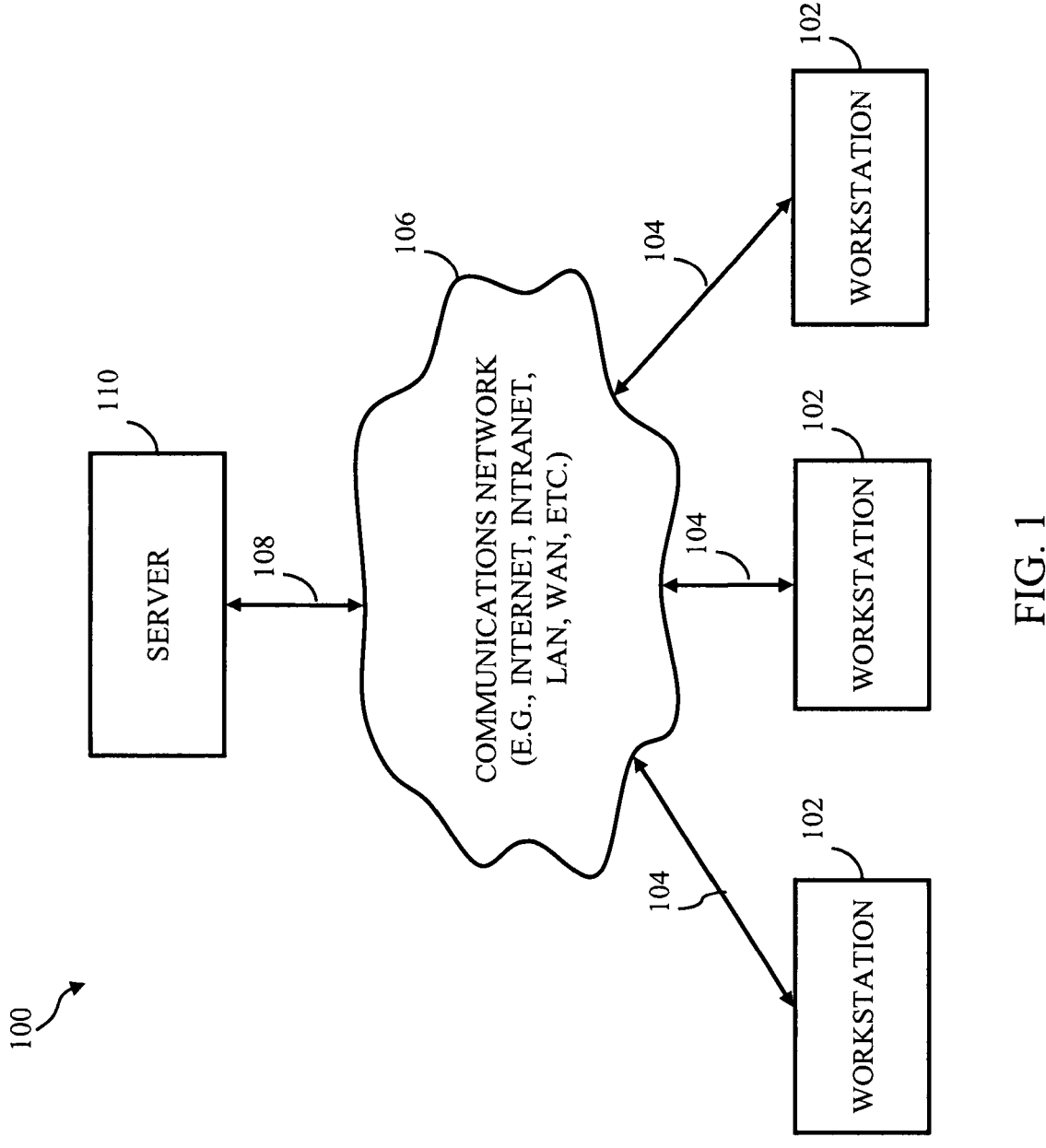
FIG. 1 is a schematic diagram of an illustrative user display system on which an interactive user display application may be implemented in accordance with some embodiments of the present invention.

In accordance with the present invention, an interactive user display application (sometimes referred to herein as "the application" or "the user display mechanism (UDM)") is provided. The application displays and refreshes images that are intended to represent users or members of a social network or other web-based service. Using these images, the interactive user display application allows a user of the application to interact with other users or their profiles while viewing their images or while interacting with or consuming media.

For example, in one particular embodiment, the UDM may be integrated with an interactive media player. In response to launching an interactive media player (e.g., a standalone media player, a media player on a website, etc.), the UDM may display selectable user images on a portion of the interactive media player or adjacent to the interactive media player while simultaneously tuning to a music station or playing back music. For example, the user may use the interactive media player to tune to a station or listen to a song by a particular artist. The UDM may then update the selectable user images to show user images of users that are currently listening to the same artist or music from the same artist. Alternatively, the UDM may update the selectable user images to show user images of users that are listening to the same song, users that are listening to similar music (e.g., same genre of music, similar artists, artists that influenced the artist that the user is currently listening to, etc.), users that are currently tuned to the same station, users that have the same artist added to their playlist, users that have bookmarked the same station, or any other suitable user.

It should be noted that the user of the application is sometimes referred to as a viewer. Nevertheless, the user images that are presented to a viewer using the application are displayed based on both user and viewer interactions with or consumption of media. For example, user images may be presented based on a viewer's interaction with music on the viewer's interactive media player. In another example, user images may be presented based on a viewer's interactions with one of the user images currently displayed by the UDM. In yet another example, user images may be presented based on a user's interactions with their profile on a social networking website or other web-based service (e.g., in response to the user indicating on the social networking website that he or she is interested in the artist U2, the UDM may display that user's image to other users interested in U2).

The UDM may display selectable user images that are refreshed, for example, after a predetermined amount of time (e.g., every 10 seconds, every 30 seconds, etc.), in response to the viewer's interactions with at least one of the user images, or in response to interactions with media displayed on an interactive media player (e.g., iTunes, a music player on a MySpace webpage, etc.). Again, it should be noted that the interactions with media may be performed by the viewer of the UDM, a user or a member of a social network or other web-based service, or any other suitable user (hereinafter "the user").

The UDM may also display selectable user images that are refreshed in response to media consumption. For example, in response to the end of a song that is currently being played to the user, the UDM may refresh the selectable user images to reflect the newly played media. In another example, in response to the user tuning to a different station or a different song, the UDM may refresh the selectable user images to reflect the newly played media.

It should be noted user images may be directly provided to the UDM provider (e.g., by using or joining the UDM provider's network), the UDM may receive user images from a third-party source, such as, for example, a social network on a web-based service provider, or any suitable combination thereof. For example, the application may provide user images of registered users of the application along with user images from multiple third-party sources (e.g., user images from MySpace, user images from Match.com, and user images from iTunes).

The user image corresponding to a user or member of a social networking website or other web-based service may be, for example, an image uploaded by the user, one of a plurality of images uploaded by the user, one or more images of the user uploaded by other users, a default image provided by the social networking website, web-based service, or UDM provider, or any other suitable image.

It should be noted that although the following embodiments of the invention are described as relating to the playback and sharing of music and playlists of music to other users, these embodiments are not limited only to music. Rather, the invention may also be applied to any suitable web content or media, such as videos, music videos, user-recorded videos, user-uploaded videos, user-selected television channels or feeds, movies, and other suitable videos, while simultaneously displaying selectable user images that are refreshed in accordance with the present invention.

In another embodiment, the UDM may work in conjunction with a third-party website, where the UDM displays and refreshes selectable user images directly on the third-party website or displays images based on user interaction with third-party websites. For example, the UDM provider may have an established relationship with Amazon.com (a third-party website) such that the UDM is displayed as a portion of the Amazon.com website. In response to a user accessing a particular book for sale on the Amazon.com website, the UDM that is working in conjunction with the Amazon.com website may display and refresh selectable user images for users that have purchased, read, and/or reviewed that book. In response to the user accessing the "Kitchens and Housewares" webpage on the Amazon.com website, the UDM may display and refresh selectable user images for users that have recently purchased items from that page, users that have reviewed items on that page, etc.

The following figures and appendices and their accompanying descriptions provide detailed examples of the implementation of the systems and methods of the present invention.

FIG. 1 is a generalized schematic diagram of a system 100 on which an interactive user display application may be implemented in accordance with some embodiments of the present invention. As illustrated, system 100 may include one or more workstations 102. Workstations 102 may be local to each other or remote from each other. Workstations 102 are connected by one or more communications links 104 to a communications network 106 that is linked via a communications link 108 to a server 110.

System 100 may include one or more servers 110. Server 110 may be any suitable server for providing access to the application, such as a processor, a computer, a data processing device, or a combination of such devices. Communications network 106 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 104 and 108 may be any communications links suitable for communicating data between workstations 102 and server 110, such as network links, dial-up links, wireless links, hard-wired links, any other suitable communications links, or a combination of such links. Workstations 102 enable a user to access features of the application. Workstations 102 may be personal computers, laptop computers, mainframe computers, dumb terminals, data displays, Internet browsers, personal digital assistants ("PDAs"), two-way pagers, wireless terminals, portable telephones, any other suitable access device, or any combination of such devices. Workstations 102 and server 110 may be located at any suitable location. In one embodiment, workstations 102 and server 110 may be located within an organization. Alternatively, workstations 102 and server 110 may be distributed between multiple organizations.

Figure 2:
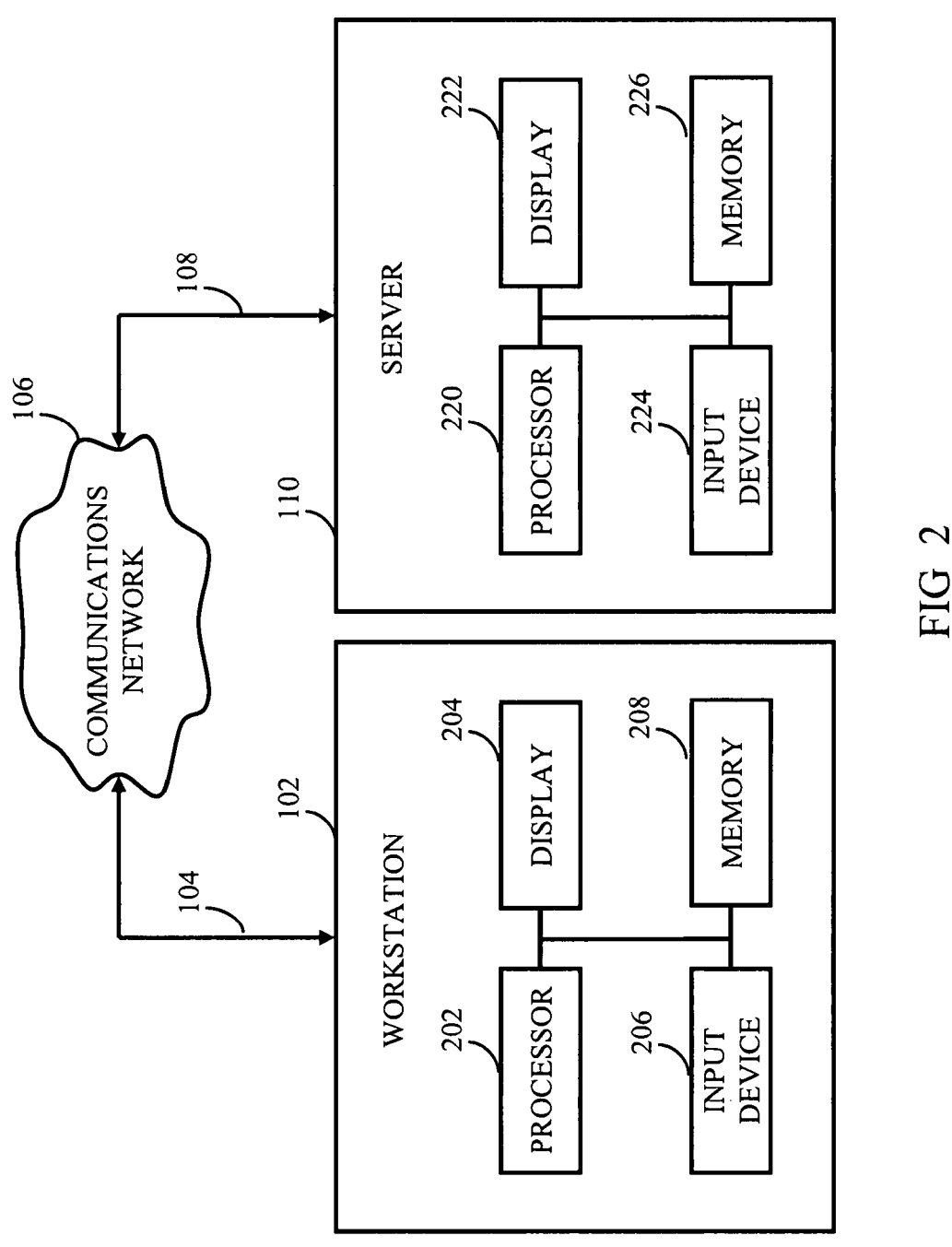
FIG. 2 is a schematic diagram of an illustrative workstation and server as provided, for example, in FIG. 1 in accordance with some embodiments of the present invention.

The server and one of the workstations, which are depicted in FIG. 1, are illustrated in more detail in FIG. 2. Referring to FIG. 2, workstation 102 may include processor 202, display 204, input device 206, and memory 208, which may be interconnected. In a preferred embodiment, memory 208 contains a storage device for storing a workstation program for controlling processor 202.

Processor 202 uses the workstation program to present on display 204 the application and the data received through communications link 104 and commands and values transmitted by a user of workstation 102. It should also be noted that data received through communications link 104 or any other communications links may be received from any suitable source, such as a social networking website (e.g., www.myspace.com), a music service (e.g., www.itunes.com), or any other suitable source. Input device 206 may be a computer keyboard, a cursor-controller, dial, switchbank, lever, or any other suitable input device as would be used by a designer of input systems or process control systems.

Server 110 may include processor 220, display 222, input device 224, and memory 226, which may be interconnected. In a preferred embodiment, memory 226 contains a storage device for storing data received through communications link 108 or through other links, and also receives commands and values transmitted by one or more users. The storage device further contains a server program for controlling processor 220.

In some embodiments, the application may include an application program interface (not shown), or alternatively, the application may be resident in the memory of workstation 102 or server 110. In another suitable embodiment, the only distribution to workstation 102 may be a graphical user interface ("GUI") which allows a user to interact with the application resident at, for example, server 110.

In one particular embodiment, the application may include client-side software, hardware, or both. For example, the application may encompass one or more Web-pages or Web-page portions (e.g., via any suitable encoding, such as HyperText Markup Language ("HTML"), Dynamic HyperText Markup Language ("DHTML"), Extensible Markup Language ("XML"), JavaServer Pages ("JSP"), Active Server Pages ("ASP"), Cold Fusion, or any other suitable approaches).

In one particular embodiment, the application may be integrated with an interactive media player (sometimes referred to herein as "the in-site user display application"). For example, the application may provide the user with the in-site user display application when the user browses through various pages of the website (e.g., the i.fm website). In response to the user viewing various pages on the website, the in-site user display application may be displayed on a portion of each page of the website.

In another embodiment, the application may work in conjunction with an interactive media player or other application (sometimes referred to herein as "the external user display application"). In yet some other embodiments, the applications may be integrated with a standalone media player application (sometimes referred to herein as "the mini-player"). For example, the external user display application or the mini-player may provide the user with the features of the in-site user display application (e.g., playing music, displaying user images that are updated or refreshed, etc.) while the user performs other actions (e.g., runs another application on the user's computer, accesses a different website, etc.).

In some embodiments, in response to launching the external user display application or the mini-player and subsequently accessing the application on the website, the application may display advertisements on the website in place of the in-site player.

It should be noted that some embodiments of the application, such as the external user display application, may also work in conjunction with other interactive media players or media services provided by entities with no affiliation to the provider of the external user display application. In some embodiments, when the user is a registered user of the UDM or if the UDM provider has an established a relationship with a third-party website or service, the external user display application may monitor the interactions with or consumption of media by users of the non-affiliated interactive media players or non-affiliated services.

The external user display application may operate in accordance with established relationships or agreements. For example:

a.) the external user display application is combined with an interactive media player through a relationship between the provider of the external user display application and the provider of the interactive media player;

b.) the external user display application is monitoring interactions with an interactive media player by virtue of an agreement with the user of the interactive media player rather than the provider of the interactive media player; or c.) the external user display application is monitoring interactions with the application in response to the user registering the application with the UDM provider or in response to the user logging in (e.g., entering a username and password).

Although the application is described herein as being implemented on a workstation and/or server, this is only illustrative. The application may be implemented on any suitable platform (e.g., a personal computer ("PC"), a mainframe computer, a dumb terminal, a data display, a two-way pager, a wireless terminal, a portable telephone, a portable computer, a palmtop computer, an H/PC, an automobile PC, a laptop computer, a cellular phone, a personal digital assistant ("PDA"), a combined cellular phone and PDA, etc.) to provide such features.

It will also be understood that the detailed description herein may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

The system according to the invention may include a general purpose computer, or a specially programmed special purpose computer. The user may interact with the system via e.g., a personal computer or over PDA, e.g., the Internet, an Intranet, etc. Either of these may be implemented as a distributed computer system rather than a single computer. Similarly, the communications link may be a dedicated link, a modem over a POTS line, the Internet and/or any other method of communicating between computers and/or users. Moreover, the processing could be controlled by a software program on one or more computer systems or processors, or could even be partially or wholly implemented in hardware.

Although a single computer may be used, the system according to one or more embodiments of the invention is optionally suitably equipped with a multitude or combination of processors or storage devices. For example, the computer may be replaced by, or combined with, any suitable processing system operative in accordance with the concepts of embodiments of the present invention, including sophisticated calculators, hand held, laptop/notebook, mini, mainframe and super computers, as well as processing system network combinations of the same. Further, portions of the system may be provided in any appropriate electronic format, including, for example, provided over a communication line as electronic signals, provided on CD and/or DVD, provided on optical disk memory, etc.

Any presently available or future developed computer software language and/or hardware components can be employed in such embodiments of the present invention. For example, at least some of the functionality mentioned above could be implemented using Visual Basic, C, C++ or any assembly language appropriate in view of the processor being used. It could also be written in an object oriented and/or interpretive environment such as Java and transported to multiple destinations to various users.

Turning to FIG. 3, a simplified flowchart illustrating the steps performed in providing an interactive user display application that displays selectable user images in accordance with some embodiments of the present invention is provided. This is a generalized flow chart. It will be understood that the steps shown in FIG. 3 may be performed in any suitable order, some steps may be deleted, and others added.

Figure 4A:
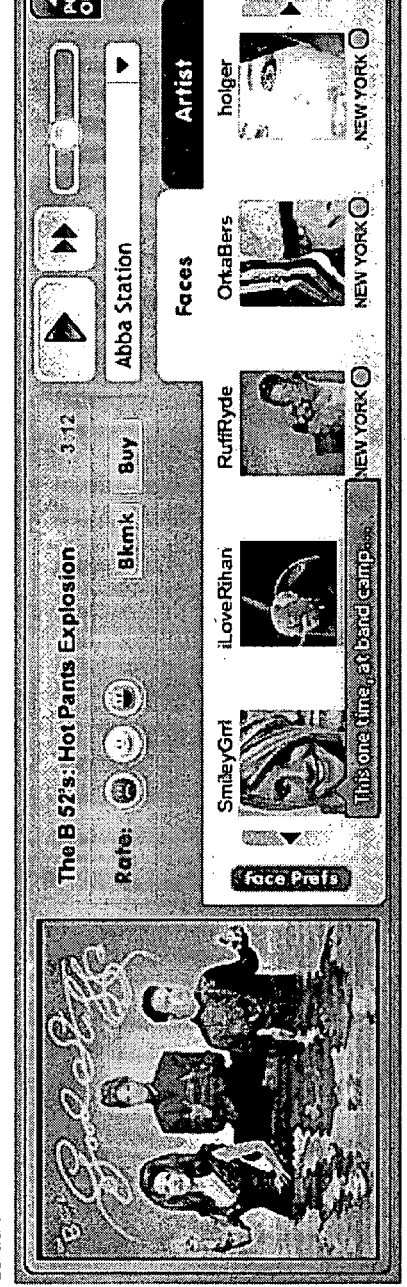
FIGS. 4A-4E are illustrative screens of the interactive user display application in accordance with some embodiments of the present invention.

As shown in FIG. 3, the process begins with displaying an application that includes multiple user images (e.g., four images, eight images, etc.) at step 310. For example, upon initiating a mini-player or in-site application, the media player may display a plurality of user images while simultaneously tuning to a music station that is either designed specifically by the user of the application or composed solely of recommendations generated by a selection algorithm based on an initial musical input by user (e.g., user-inputted music preferences). As shown in FIG. 4A, a plurality of user images or faces are displayed while simultaneously tuning to the "Abba Station." The "Abba Station" is currently playing the song "Hot Pants Explosion" by the musical artist "the B-52's."

In some embodiments, the application may allow the user to select from a list of music stations (e.g., a user-created music station, etc.). In response to the user making a musical selection, a music station may be created or selected and the application may determine which user images to display on the media player. For example, the application may select user images based on musical compatibility (e.g., users that are listening to music from the same artist, users that are listening to the same song, users that are listening to similar music, users that are currently tuned to the user-created station, users that are currently tuned to a similar station, users that have the same artist added to their playlist, users that have bookmarked the same station, users that created the station that is being currently tuned to, etc.), the user's preferences (e.g., musical preferences, age preferences, ethnicity preferences, relationship status preferences, educational preferences, etc.), a user profile that the user submitted, geographic proximity to the user, etc.

In some embodiments, user images may be displayed by the application based on location and popularity. In accordance with this feature, the application may provide the user with user images of members that are close in geographic proximity and/or members that have achieved a high degree of click-on popularity.

In some embodiments, the application may indicate the musical compatibility between the user and the displayed user image. For example, an icon may be displayed indicating high musical compatibility between the user and displayed user image (e.g., listening to the same genre of music, listening to the same song, etc.).

It should be noted that the application may provide the user with other advance features, such as providing the user with additional information on one or more of the displayed user images (see, e.g., FIG. 4B), allowing the user to tune to a station that is currently tuned to by one or more of the displayed user images (see, e.g., FIG. 4B), purchasing the song that is currently being listened to (see, e.g., FIG. 4E), purchasing the album that is currently being listened to (see, e.g., FIG. 4E), directing the user to a website for purchasing the song or the album (see, e.g., FIG. 4E), providing the user with additional information on the artist that is currently being listened to (see, e.g., FIG. 4C), rating the song that is currently being listened to (see, e.g., FIG. 4A-4D), bookmarking the song that is currently being listened to, bookmarking the station that the user is currently tuned to, providing news or artist updates, etc.

For example, as shown in FIGS. 4A-4E, in response to the user selecting the "Buy" button, the application may link the user to an electronic commerce website (e.g., iTunes.com, Amazon.com, Walmart.com, etc.) for purchasing the song or album that is currently being listened to. As also shown in FIGS. 4A-4E, the application may allow the user to bookmark the station, artist, album, and/or song that the user is currently listening to.

Figure 4B:
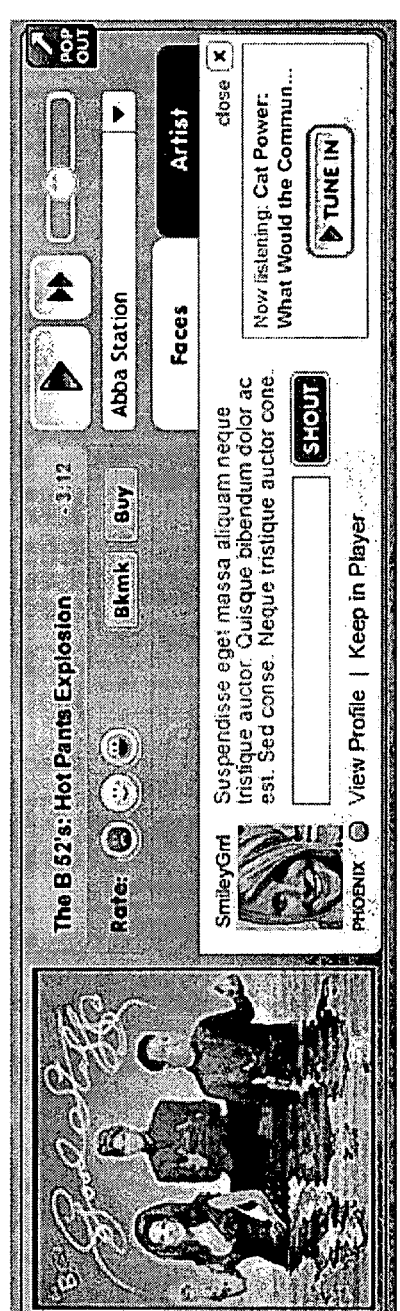

In another example, as shown in FIG. 4B, the application may allow the user to select one of the displayed user images. In response, the application may provide the user with information relating to the user associated with the selected user image (e.g., a profile, additional images of the user, music interests of the user, etc.). In addition, the application may allow the user to tune to a station that the user corresponding to selected user image is currently listening to. Upon tuning out of the station, the application may prompt the user to send a message (e.g., a thank you message) to the user corresponding to the selected user image (see, e.g., FIG. 4D). Alternatively, the application may allow the user to provide feedback to the user corresponding to the selected user image on, for example, the music station. In response to sending a message and/or feedback, that user may receive alerts from the application (e.g., new e-mail, new comment, new friend request, new thank you, new shout, etc.).

In some embodiments, the application may allow the user to share the station that the user is currently tuned to with one or more users by clicking on one or more of the displayed user images.

Figure 4C:
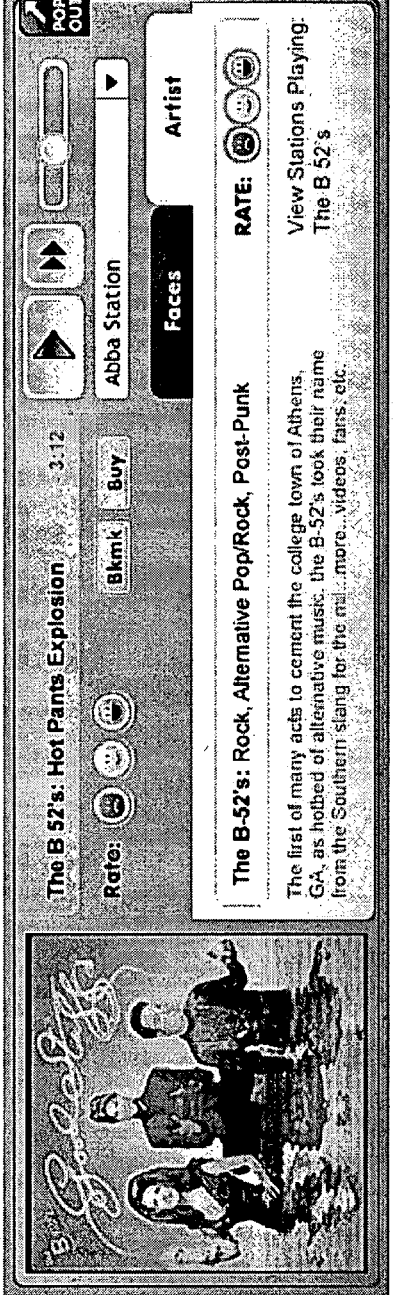
Figure 4D:
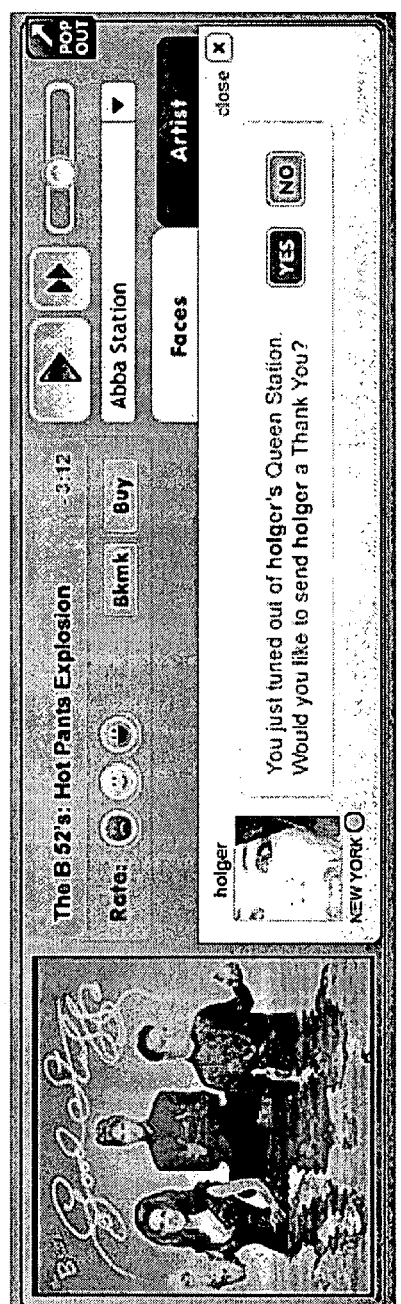
Figure 4E:
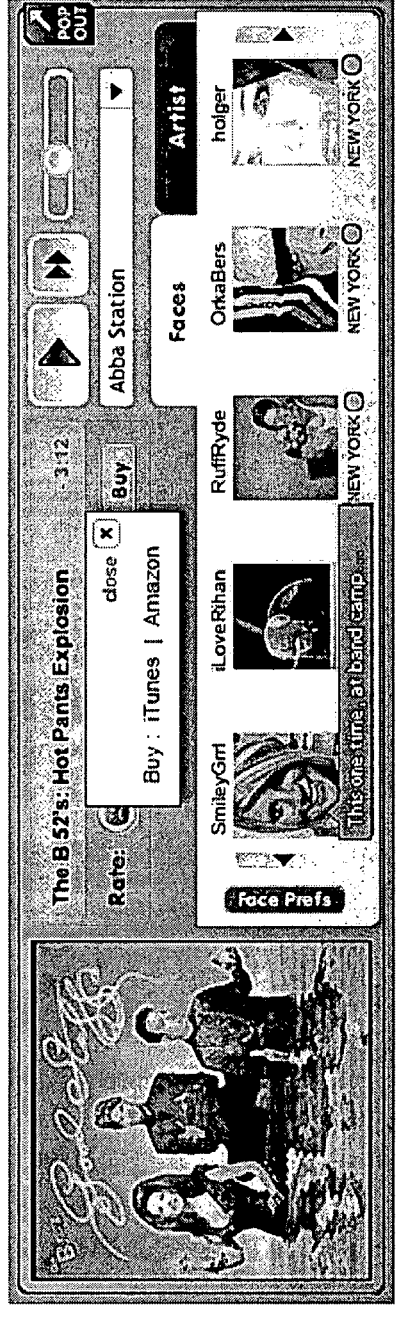

In some embodiments, the application may provide the user with a searching interface. For example, as shown in FIG. 4C, the application may allow the user to search or view other stations that are playing music from the same artist, music from the same genre (e.g. rock, alternative pop, post-punk, classical, rap, etc.), the same song, etc.

In some embodiments, the application may provide the user with a navigation bar or any other suitable user interface for inputting user preferences, musical selections, ratings, etc. These user preferences, musical selections, ratings, and other information may be stored in a database, such as a relational database.

At step 320, the application may update the user images on the media player. In some embodiments, the application may update the user images on the media player in response to the user's interactions with the media player. For example, the user may tune to a different music station. In response, the application may select other user images based on which users are listening to the newly tuned song, which users are tuned to the newly chosen music station, which user created the different music station, etc.

In some embodiments, the application may update the user images at a predetermined time. In one example, the application may filter through the user images stored in a database and determine that fifty user images match the user's profile, are users that are listening to the same song, are users that are tuned to the same station, etc. However, the application may be limited to displaying eight images to the user. In response, the application may select to display a set of eight images (e.g., randomly, using an algorithm to prioritize the user images, etc.). After a predetermined amount of time (e.g., 10 seconds, 30 seconds, 1 minute, etc.), the application may display another set of user images.

It should be noted that, in some embodiments, the application may automatically update the user images in response to media consumption. For example, the application may automatically refresh user images based on the media currently being played to the user. When the song that is currently being played ends, the application may automatically refresh the user images based on the next song. In another example, the application may provide the user with a random feature, where the application randomly tunes the user to a different station at the end of every song. In response to tuning to a different station and playing back a different song, the application may automatically refresh the selectable user images to reflect such a change (e.g., show users that are tuned to the newly chosen song, users that are listening to the music by the same artist, etc.). Each new song brings in new media and a new user images.

It should also be noted that if the song ends prior to a given endpoint (e.g., the user tunes to a different station, the user selects a different artist, etc.), the application refreshes the user images to reflect the new media being consumed by the user.

It should be noted that the application may allow the user to select to retain a user image for display on the media player. For example, the user may review the first set of user images displayed on the media player and select that "Frank" continue to be displayed on the media player. In response, the application may select to display "Frank" and a set of seven user images to replace the user images not selected by the user.

It should also be noted that the application may use any suitable approach to refresh the user images. For example, the application may fade out the displayed user images and fade in a new set of user images.

It should also be noted that the application may receive user images using any suitable approach. For example, a server may send the user images to the application in a stream. As described previously, user images may be directly provided to the UDM provider (e.g., a server running the user display application), the application may receive user images from a third-party source, such as, for example, a social network or a web-based service provider, or any suitable combination thereof. For example, the application may provide user images of registered users of the application along with user images from multiple third-party sources (e.g., user images from MySpace, user images from Match.com, and user images from iTunes).

At step 330, in response to the user selecting one of the displayed user images, the application provides the user with a plurality of options for interacting with the user associated with the selected user image. In some embodiments, the application may allow the user to send a message to the user associated with the selected user image via either email or through the user display (see, e.g., FIGS. 4B and 4D). In some embodiments, the application may allow the user to view a playlist of other music selections made by the user associated with the selected user image (see, e.g., FIG. 4B). In some embodiments, the application may allow the user to send the user associated with the selected user image a playlist of music compiled by the user. In some embodiments, the application may allow the user to view additional information on the user associated with the selected user image (e.g., demographic information, a user profile, etc.) (see, e.g., FIG. 4B).

Figure 5:
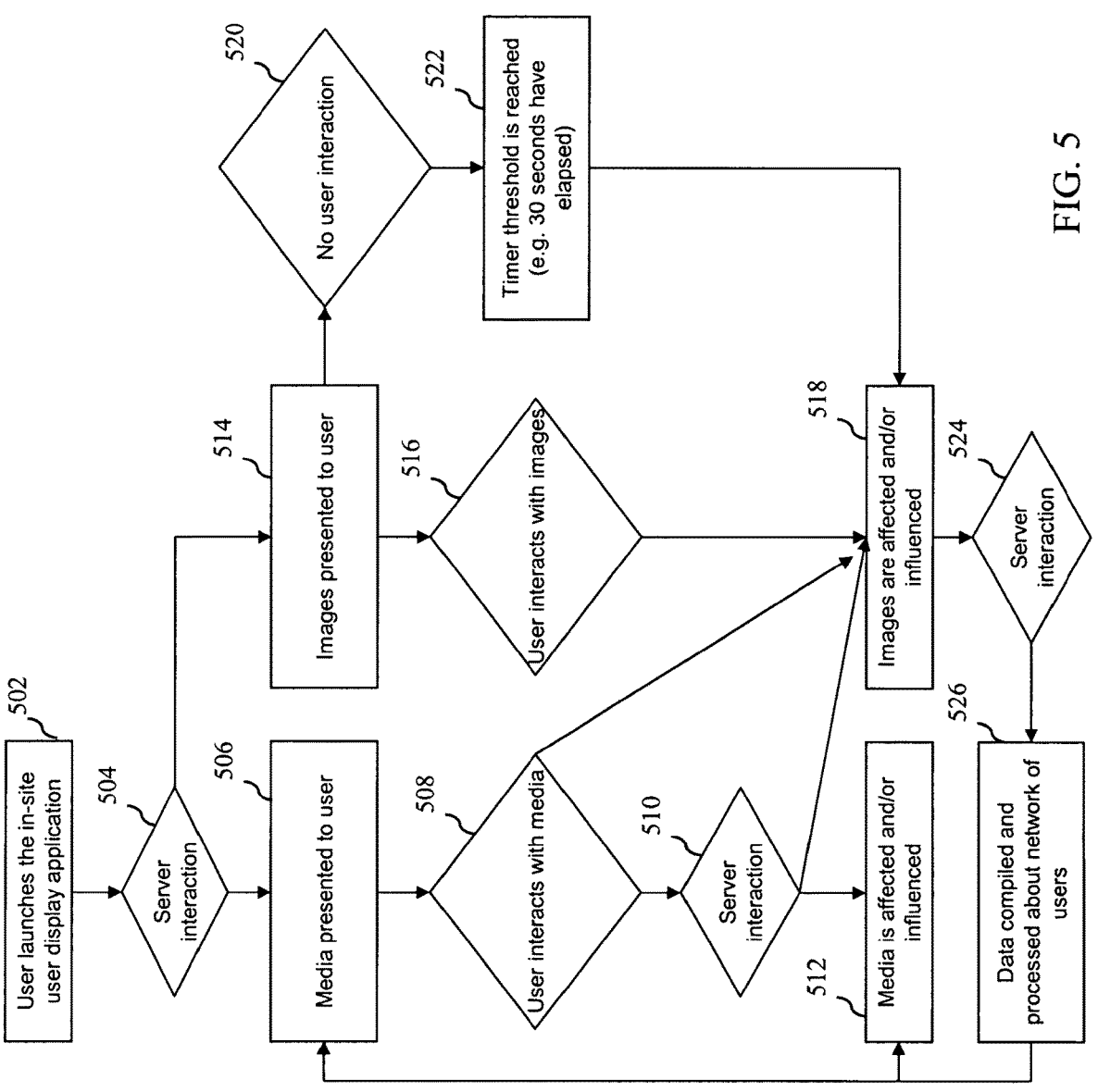
FIG. 5 is a flowchart illustrating the steps performed in providing an interactive user display application that displays selectable user images based on user consumption of media, user interaction with images, and/or a timing threshold being reached in accordance with some embodiments of the present invention is provided.

Turning to FIG. 5, a simplified flowchart illustrating the steps performed in providing an interactive user display application that displays selectable user images in accordance with some embodiments of the present invention is provided. This is also a generalized flow chart. It will be understood that the steps shown in FIG. 5 may be performed in any suitable order, some steps may be deleted, and others added.

As shown in FIG. 5, the process begins with the user launching the application (e.g., the application as an add-in to a media player, the application as an add-in on a website, etc.) at step 502. In response to launching the application, the application interacts with a server, such as server 110 (step 504). The interaction with the server may include, for example, retrieving user information, retrieving user preferences, transmitting information to the application, etc. In response, the application presents media to the user at step 506. The user may interact with the media at step 508. As described previously, the user of the application may input user preferences, musical selections, ratings, etc. In addition, the user may switch to a different user-created station, create a bookmark for the station, add a song to the user's playlist, etc. The application may monitor the user's interactions with the media and transmit the monitored information to the server at step 510. In response, the application may alter the media that the user is receiving at step 512. For example, the application may present the user with another station, other media, other playlists, etc.

Simultaneous to the in-site user display application presenting the media to the user, the application displays multiple user images (e.g., four images, eight images, etc.) at step 514. For example, the media player may display a plurality of user images while simultaneously tuning to a music station that is either designed specifically by the user of the application or composed solely of recommendations generated by a selection algorithm based on an initial musical input by user (e.g., user-inputted music preferences).

If the user of the application interacts with one or more of the displayed user images at step 516, the application provides the user with a plurality of options for interacting with the user associated with the selected user image. In some embodiments, the application may allow the user to send a message to the user associated with the selected user image. In some embodiments, the application may allow the user to view a playlist of other music selections made by the user associated with the selected user image. In some embodiments, the application may allow the user to send the user associated with the selected user image a playlist of music compiled by the user. In some embodiments, the application may allow the user to view additional information on the user associated with the selected user image (e.g., demographic information, a user profile, etc.).

In some embodiments, the application may update the displayed user images in response to the user's interactions with one or more of the currently displayed user images (step 518). For example, the user may select to receive additional information on one of the four user images. In response, the application may retrieve three user images when updating the set of user images.

Alternatively, at step 520, the application may update the user images in response to no user interaction. For example, the application may update the user images at a predetermined time or after an event threshold is reached (step 522). In one example, the application may filter through the user images stored in a database and determine that there are a plurality of user images that match the user's profile, are users that are listening to the same song, are users that are tuned to the same station, etc. However, the application may be limited to displaying eight images to the user. In response, the application may select to display a set of eight images (e.g., randomly, using an algorithm to prioritize the user images, etc.). After the event threshold is reached (e.g., 10 seconds, 30 seconds, 1 minute, end of the song, etc.), the application may display another set of user images (see, e.g., step 518).

In another example, the application may automatically update the user images in response to media consumption (e.g., based on the media currently being played to the user). When the song that is currently being played ends, the application may automatically refresh the user images based on the next song. In another example, the application may provide the user with a random feature, where the application randomly tunes the user to a different station at the end of every song. In response to tuning to a different station and playing back a different song, the application may automatically refresh the selectable user images to reflect such a change (e.g., show users that are tuned to the newly chosen song, users that are listening to the music by the same artist, etc.). Each new song brings in new media and a new user images.

At step 524, the application compiles the data received about the network of users—e.g., data relating to the media presented to the user, data relating to the user images that the user selected, data relating to the user images that the user did not select, data relating to other users that communicated with the user of the application, etc. Using this collected data, the application may perform a number of actions. For example, the application may change the media presented to the user after launching the application. In another example, the application may ensure that the user of the application is not presented with the same user image within a predetermined time (e.g., no repeats in two days).

Accordingly, an interactive user display application is provided.

It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the present invention has been described and illustrated in the foregoing exemplary embodiments, it is understood that the present disclosure has been made only by way of example, and that numerous changes in the details of implementation of the invention may be made without departing from the spirit and scope of the invention.

What is claimed is:

1. A method for facilitating connectivity between users, the method comprising:

displaying, in a first portion of a user interface, a media player that receives a media stream of a plurality of media streams, wherein each of the plurality of media streams is selected based on music preferences associated with a user account and wherein each of the plurality of media streams is received from one or more media servers;

displaying, in a second portion of the user interface, a plurality of selectable user images based on relationship information associated with the user account, wherein each of the plurality of selectable user images represents another user account that is connected to the user account;

receiving media consumption information corresponding to a plurality of user accounts from the one or more media servers;

in response to receiving the media consumption information from the one or more media servers, determining whether the media consumption information, user interactions with the media player, and a predetermined time elapsing correspond to at least one of the plurality of selectable user images currently being displayed in the second portion of the user interface; and in response to determining that at least the portion of the media consumption information, the user interactions with the media player, and the predetermined time elapsing correspond to at least one of the plurality of selectable user images currently being displayed in the second portion of the user interface, automatically updating, without receiving input from a user of the user account, the plurality of selectable user images being displayed in the second portion of the user interface with the portion of the media consumption information.

2. The method of claim 1, wherein the selectable user images in the plurality of selectable user images are further selected for display based on the media consumption information that includes at least one of: users currently tuned to a same station being provided by the media stream, users listening to a same song being provided by the media stream, users listening to music being provided by the media stream from a same artist, users listening to a song from a same album corresponding to media being provided by the media stream, and users that have added media including media being provided by the media stream to a playlist.

3. The method of claim 1, wherein the selectable user images in the plurality of selectable user images are further selected for display based on user preferences associated with the user account.

4. The method of claim 1, wherein the selectable user images in the plurality of selectable user images are further selected for display based on demographic information associated with the user account.

5. The method of claim 1, wherein the selectable user images in the plurality of selectable user images are further selected for display based on prior interaction information with the user interface.

6. The method of claim 1, wherein the selectable user images in the plurality of selectable user images are further selected for display based on prior interaction information with one or more selectable user images.

7. The method of claim 1, wherein the selectable user images in the plurality of selectable user images are further selected for display based on user interaction information with a social networking website corresponding to a social network on which the user account is connected to the another user account.

8. The method of claim 1, wherein the selectable user images in the plurality of selectable user images are further selected for display based on user interaction information with a third-party website.

9. The method of claim 1, wherein the method further comprises, in response to receiving a selection of one of the selectable user images from the updated plurality of selectable user images, displaying information associated with the selected user image and providing the user of the user account that provided the selection of the selected user image with an opportunity to interact with a second user associated with the another user account corresponding to the selected user image.

10. The method of claim 9, wherein providing the user of the user account that provided the selection of the selected user image with the opportunity to interact with the second user associated with the another user account corresponding to the selected user image comprises allowing the user to perform at least one of: transmitting a message, directing the user to media associated with the selected user image, and sharing media with the second user.

11. A method for facilitating connectivity between users, the method comprising:

displaying, in a first portion of a user interface, a media player that receives a media stream of a plurality of media streams, wherein each of the plurality of media streams is selected based on music preferences associated with a user account and wherein each of the plurality of media streams is received from one or more media servers;

displaying, in a second portion of the user interface, a plurality of selectable user images based on relationship information associated with the user account, wherein each of the plurality of selectable user images represents a member account that is registered with a media service that provides the media player and that is connected to the user account via a social network;

receiving media consumption information corresponding to a plurality of user accounts from the one or more media servers;

in response to receiving the media consumption information from the one or more media servers, determining whether the media consumption information, user interactions with the media player, and a predetermined time elapsing correspond to at least one of the plurality of selectable user images currently being displayed in the second portion of the user interface; and in response to determining that at least the portion of the media consumption information, the user interactions with the media player, and the predetermined time elapsing correspond to at least one of the plurality of selectable user images currently being displayed in the second portion of the user interface, automatically updating, without receiving input from a user of the user account, the plurality of selectable user images being displayed in the second portion of the user interface with the portion of the media consumption information.

12. The method of claim 11, wherein the selectable user images in the plurality of selectable user images are further selected for display based on the media consumption information that includes at least one of: users currently tuned to a same station being provided by the media stream, users listening to a same song being provided by the media stream, users listening to music being provided by the media stream from a same artist, users listening to a song from a same album corresponding to media being provided by the media stream, and users that have added media including media being provided by the media stream to a playlist.

13. The method of claim 11, wherein the selectable user images in the plurality of selectable user images are further selected for display based on user preferences associated with the user account.

14. The method of claim 11, wherein the selectable user images in the plurality of selectable user images are further selected for display based on demographic information associated with the user account.

15. The method of claim 11, wherein the selectable user images in the plurality of selectable user images are further selected for display based on prior interaction information with the user interface.

16. The method of claim 11, wherein the selectable user images in the plurality of selectable user images are further selected for display based on prior interaction information with one or more selectable user images.

17. The method of claim 11, wherein the selectable user images in the plurality of selectable user images are further selected for display based on user interaction information with a social networking website corresponding to the social network on which the user account is connected to the member account.

18. The method of claim 11, wherein the selectable user images in the plurality of selectable user images are further selected for display based on user interaction information with a third-party website.

19. The method of claim 11, wherein the method further comprises, in response to receiving a selection of one of the selectable user images from the updated plurality of selectable user images, displaying information associated with the selected user image and providing the user of the user account that provided the selection of the selected user image with an opportunity to interact with a second user associated with the member account corresponding to the selected user image.

20. The method of claim 19, wherein providing the user of the user account that provided the selection of the selected user image with the opportunity to interact with the second user associated with the member account corresponding to the selected user image comprises allowing the user to perform at least one of: transmitting a message, directing the user to media associated with the selected user image, and sharing media with the second user.

* * * * *